United States Patent
Chirala et al.

(10) Patent No.: US 11,737,010 B2
(45) Date of Patent: Aug. 22, 2023

(54) TECHNIQUES FOR EXPOSURE-BASED SUSPENSIONS OF COMMUNICATION ATTEMPTS

(71) Applicant: QUALCOMM Incorporated, San Diego, CA (US)

(72) Inventors: Ramesh Chandra Chirala, San Diego, CA (US); Bhupesh Manoharlal Umatt, Poway, CA (US); Troy Curtiss, Boulder, CO (US); Daniel Amerga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 125 days.

(21) Appl. No.: 17/449,755

(22) Filed: Oct. 1, 2021

(65) Prior Publication Data

US 2022/0116852 A1    Apr. 14, 2022

Related U.S. Application Data

(60) Provisional application No. 63/198,319, filed on Oct. 9, 2020.

(51) Int. Cl.
*H04W 48/02* (2009.01)
*H04W 76/18* (2018.01)
*H04W 76/15* (2018.01)
*H04W 48/12* (2009.01)

(52) U.S. Cl.
CPC ........... *H04W 48/02* (2013.01); *H04W 48/12* (2013.01); *H04W 76/15* (2018.02); *H04W 76/18* (2018.02)

(58) Field of Classification Search
None
See application file for complete search history.

(56) References Cited

U.S. PATENT DOCUMENTS

| 10,091,705 B1 * | 10/2018 | Shikari ................. H04W 76/18 |
| 2013/0322234 A1 | 12/2013 | Mohseni et al. |

FOREIGN PATENT DOCUMENTS

| WO | 2015064728 A1 | 5/2015 |
| WO | 2016019541 A1 | 2/2016 |
| WO | 2020092524 A1 | 5/2020 |

OTHER PUBLICATIONS

International Search Report and Written Opinion—PCT/US2021/071708—ISA/EPO—dated Dec. 13, 2021.

* cited by examiner

*Primary Examiner* — Hong S Cho
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may communicate via a first connection using one or more transmit parameters. The UE may determine to suspend subsequent attempts to communicate via a second connection, in a dual connection mode, based at least in part on satisfaction of a threshold number of failed attempts to communicate via the second connection. The UE may determine one or more parameters for suspension of the subsequent attempts to communicate via the second connection based at least in part on a determination that satisfaction of the threshold number of failed attempts is associated with one or more exposure conditions that are based at least in part on the one or more transmit parameters. Numerous other aspects are provided.

30 Claims, 5 Drawing Sheets

TECHNIQUES FOR EXPOSURE-BASED SUSPENSIONS OF COMMUNICATION ATTEMPTS

CROSS-REFERENCE TO RELATED APPLICATION

This patent application claims priority to U.S. Provisional Patent Application No. 63/198,319, filed on Oct. 9, 2020, entitled "TECHNIQUES FOR EXPOSURE-BASED SUSPENSIONS OF COMMUNICATION ATTEMPTS," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for exposure-based suspensions of communication attempts.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes communicating via a first connection using one or more transmit parameters; identifying that a threshold number of failed attempts to communicate via a second connection in a dual connectivity mode has been satisfied; and identifying one or more parameters for suspension of subsequent attempts to communicate via the second connection based at least in part on a determination that the threshold number of failed attempts is associated with one or more exposure conditions that are based at least in part on the one or more transmit parameters.

In some aspects, the suspension of the subsequent attempts comprises a blacklisting process to blacklist a cell associated with the second connection.

In some aspects, the second connection is associated with one or more cell parameters including one or more of: a radio access technology, a cell identification, a bandwidth, a bandwidth part, or a frequency range of operation.

In some aspects, the suspension of the subsequent attempts to communicate via the second connection includes a suspension of attempts to communicate with connections having one or more parameters in common with the second connection.

In some aspects, the determination that the threshold number of failed attempts is associated with the one or more exposure conditions that are based at least in part on the one or more transmit parameters comprises: a determination that the threshold number of failed attempts to communicate via the second connection is based at least in part on application of a power limiting operation that is applied to one or more transmit parameters associated with the threshold number of failed attempts.

In some aspects, the application of the power limiting operation is based at least in part on using the one or more transmit parameters for communicating via the first connection.

In some aspects, the one or more parameters for suspension of the subsequent attempts to communicate via the second connection comprise one or more of: a duration for the suspension of the subsequent attempts to communicate via the second connection, an indication of whether to enforce the suspension of the subsequent attempts to communicate via the second connection, or an indication of whether to suspend subsequent attempts to communicate via other connections having one or more parameters in common with the second connection.

In some aspects, the method includes identifying one or more conditions that allow an increase in transmission power for one or more of the subsequent attempts to communicate via the second connection; and modifying the one or more parameters for the suspension of the subsequent attempts to communicate via the second connection.

In some aspects, the modification of the one or more parameters for the suspension of the subsequent attempts to communicate via the second connection comprises: termination of the suspension of the subsequent attempts to communicate via the second connection; and resumption of the subsequent attempts to communicate via the second connection.

In some aspects, the one or more conditions comprise: a change in a transmit power associated with communicating via the first connection, a change in an average transmission power associated with communicating via the first connection, or a change of one or more transmit parameters of an additional connection.

In some aspects, the determination of the one or more parameters for suspension of the subsequent attempts to communicate via the second connection is based at least in part on one or more of: one or more parameters of a candidate connection, having one or more parameters in common with the second connection, via a neighbor cell, a radio access technology of the second connection, a bandwidth of the second connection, a bandwidth part of the second connection, or a frequency range of operation for the second connection.

In some aspects, the method includes attempting to communicate via the second connection before the identification that the threshold number of failed attempts to communication via the second connection in the dual connectivity mode has been satisfied.

In some aspects, the method includes attempting to communicate via the second connection after the suspension of the subsequent attempts to communicate via the second connection.

In some aspects, a UE for wireless communication includes a memory and one or more processors coupled to the memory, the one or more processors configured to: communicate via a first connection using one or more transmit parameters; identifying that a threshold number of failed attempts to communicate via a second connection in a dual connectivity mode has been satisfied; and identifying one or more parameters for suspension of subsequent attempts to communicate via the second connection based at least in part on a determination that the threshold number of failed attempts is associated with one or more exposure conditions that are based at least in part on the one or more transmit parameters.

In some aspects, the suspension of the subsequent attempts comprises a blacklisting process to blacklist a cell associated with the second connection.

In some aspects, the second connection is associated with one or more cell parameters including one or more of: a radio access technology, a cell identification, a bandwidth, or a bandwidth part.

In some aspects, the suspension of the subsequent attempts to communicate via the second connection includes a suspension of attempts to communicate with connections having one or more parameters in common with the second connection.

In some aspects, the determination that satisfaction of the threshold number of failed attempts is associated with the one or more exposure conditions that are based at least in part on the one or more transmit parameters comprises: a determination that the threshold number of failed attempts to communicate via the second connection is based at least in part on application of a power limiting operation that is applied to one or more transmit parameters associated with the threshold number of failed attempts.

In some aspects, the application of the power limiting operation is based at least in part on using the one or more transmit parameters for communicating via the first connection.

In some aspects, the one or more parameters for suspension of the subsequent attempts to communicate via the second connection comprise one or more of: a duration for the suspension of the subsequent attempts to communicate via the second connection, an indication of whether to enforce the suspension of the subsequent attempts to communicate via the second connection, or an indication of whether to suspend subsequent attempts to communicate via other connections having one or more parameters in common with the second connection.

In some aspects, the one or more processors are further configured to: identify one or more conditions that allow an increase in transmission power for one or more of the subsequent attempts to communicate via the second connection; and modify the one or more parameters for the suspension of the subsequent attempts to communicate via the second connection.

In some aspects, the modification of the one or more parameters for the suspension of the subsequent attempts to communicate via the second connection comprises: termination of the suspension of the subsequent attempts to communicate via the second connection; and resumption of the subsequent attempts to communicate via the second connection.

In some aspects, the one or more conditions comprise: a change in a transmit power associated with communicating via the first connection, a change in an average transmission power associated with communicating via the first connection, or a change of one or more transmit parameters of an additional connection.

In some aspects, the determination of the one or more parameters for suspension of the subsequent attempts to communicate via the second connection is based at least in part on one or more of: one or more parameters of a candidate connection, having one or more parameters in common with the second connection, via a neighbor cell, a radio access technology of the second connection, a bandwidth of the second connection, or a bandwidth part of the second connection.

In some aspects, the one or more processors are further configured to attempt to communicate via the second connection before the identification that the threshold number of failed attempts to communication via the second connection in the dual connectivity mode has been satisfied.

In some aspects, the one or more processors are further configured to attempt to communicate via the second connection after the suspension of the subsequent attempts to communicate via the second connection.

In some aspects, a non-transitory computer-readable medium storing a set of instructions for wireless communication includes one or more instructions that, when executed by one or more processors of a UE, cause the UE to: communicate via a first connection using one or more transmit parameters; identify that a threshold number of failed attempts to communicate via a second connection in a dual connectivity mode has been satisfied; and identify one or more parameters for suspension of subsequent attempts to communicate via the second connection based at least in part on a determination that the threshold number of failed attempts is associated with one or more exposure conditions that are based at least in part on the one or more transmit parameters.

In some aspects, the suspension of the subsequent attempts comprises a blacklisting process to blacklist a cell associated with the second connection.

In some aspects, the second connection is associated with one or more cell parameters including one or more of: a radio access technology, a cell identification, a bandwidth, or a bandwidth part.

In some aspects, the suspension of the subsequent attempts to communicate via the second connection includes a suspension of attempts to communicate with connections having one or more parameters in common with the second connection.

In some aspects, the determination that satisfaction of the threshold number of failed attempts is associated with the one or more exposure conditions that are based at least in part on the one or more transmit parameters comprises: a determination that the threshold number of failed attempts to communicate via the second connection is based at least in part on application of a power limiting operation that is applied to one or more transmit parameters associated with the threshold number of failed attempts.

In some aspects, the application of the power limiting operation is based at least in part on using the one or more transmit parameters for communicating via the first connection.

In some aspects, the one or more parameters for suspension of the subsequent attempts to communicate via the second connection comprise one or more of: a duration for the suspension of the subsequent attempts to communicate via the second connection, an indication of whether to enforce the suspension of the subsequent attempts to communicate via the second connection, or an indication of whether to suspend subsequent attempts to communicate via other connections having one or more parameters in common with the second connection.

In some aspects, the one or more instructions further cause the UE to: identify one or more conditions that allow an increase in transmission power for one or more of the subsequent attempts to communicate via the second connection; and modify the one or more parameters for the suspension of the subsequent attempts to communicate via the second connection.

In some aspects, the modification of the one or more parameters for the suspension of the subsequent attempts to communicate via the second connection comprises: termination of the suspension of the subsequent attempts to communicate via the second connection; and resumption of the subsequent attempts to communicate via the second connection.

In some aspects, the one or more conditions comprise: a change in a transmit power associated with communicating via the first connection, a change in an average transmission power associated with communicating via the first connection, or a change of one or more transmit parameters of an additional connection.

In some aspects, the determination of the one or more parameters for suspension of the subsequent attempts to communicate via the second connection is based at least in part on one or more of: one or more parameters of a candidate connection, having one or more parameters in common with the second connection, via a neighbor cell, a radio access technology of the second connection, a bandwidth of the second connection, or a bandwidth part of the second connection.

In some aspects, the one or more instructions further cause the UE to: attempt to communicate via the second connection before the identification that the threshold number of failed attempts to communication via the second connection in the dual connectivity mode has been satisfied.

In some aspects, the one or more instructions further cause the UE to: attempt to communicate via the second connection after the suspension of the subsequent attempts to communicate via the second connection.

In some aspects, an apparatus for wireless communication includes means for communicating via a first connection using one or more transmit parameters; means identifying that a threshold number of failed attempts to communicate via a second connection in a dual connectivity mode has been satisfied; and means for identifying one or more parameters for suspension of subsequent attempts to communicate via the second connection based at least in part on a determination that the threshold number of failed attempts is associated with one or more exposure conditions that are based at least in part on the one or more transmit parameters.

In some aspects, the suspension of the subsequent attempts comprises a blacklisting process to blacklist a cell associated with the second connection.

In some aspects, the second connection is associated with one or more cell parameters including one or more of: a radio access technology, a cell identification, a bandwidth, or a bandwidth part.

In some aspects, the suspension of the subsequent attempts to communicate via the second connection includes a suspension of attempts to communicate with connections having one or more parameters in common with the second connection.

In some aspects, the determination that satisfaction of the threshold number of failed attempts is associated with the one or more exposure conditions that are based at least in part on the one or more transmit parameters comprises: a determination that the threshold number of failed attempts to communicate via the second connection is based at least in part on application of a power limiting operation that is applied to one or more transmit parameters associated with the threshold number of failed attempts.

In some aspects, the application of the power limiting operation is based at least in part on using the one or more transmit parameters for communicating via the first connection.

In some aspects, the one or more parameters for suspension of the subsequent attempts to communicate via the second connection comprise one or more of: a duration for the suspension of the subsequent attempts to communicate via the second connection, an indication of whether to enforce the suspension of the subsequent attempts to communicate via the second connection, or an indication of whether to suspend subsequent attempts to communicate via other connections having one or more parameters in common with the second connection.

In some aspects, the apparatus includes means for identifying one or more conditions that allow an increase in transmission power for one or more of the subsequent attempts to communicate via the second connection; and means for modifying the one or more parameters for the suspension of the subsequent attempts to communicate via the second connection.

In some aspects, the modification of the one or more parameters for the suspension of the subsequent attempts to communicate via the second connection comprises: termination of the suspension of the subsequent attempts to communicate via the second connection; and resumption of the subsequent attempts to communicate via the second connection.

In some aspects, the one or more conditions comprise: a change in a transmit power associated with communicating via the first connection, a change in an average transmission power associated with communicating via the first connection, or a change of one or more transmit parameters of an additional connection.

In some aspects, the determination of the one or more parameters for suspension of the subsequent attempts to communicate via the second connection is based at least in part on one or more of: one or more parameters of a candidate connection, having one or more parameters in common with the second connection, via a neighbor cell, a radio access technology of the second connection, a bandwidth of the second connection, or a bandwidth part of the second connection.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
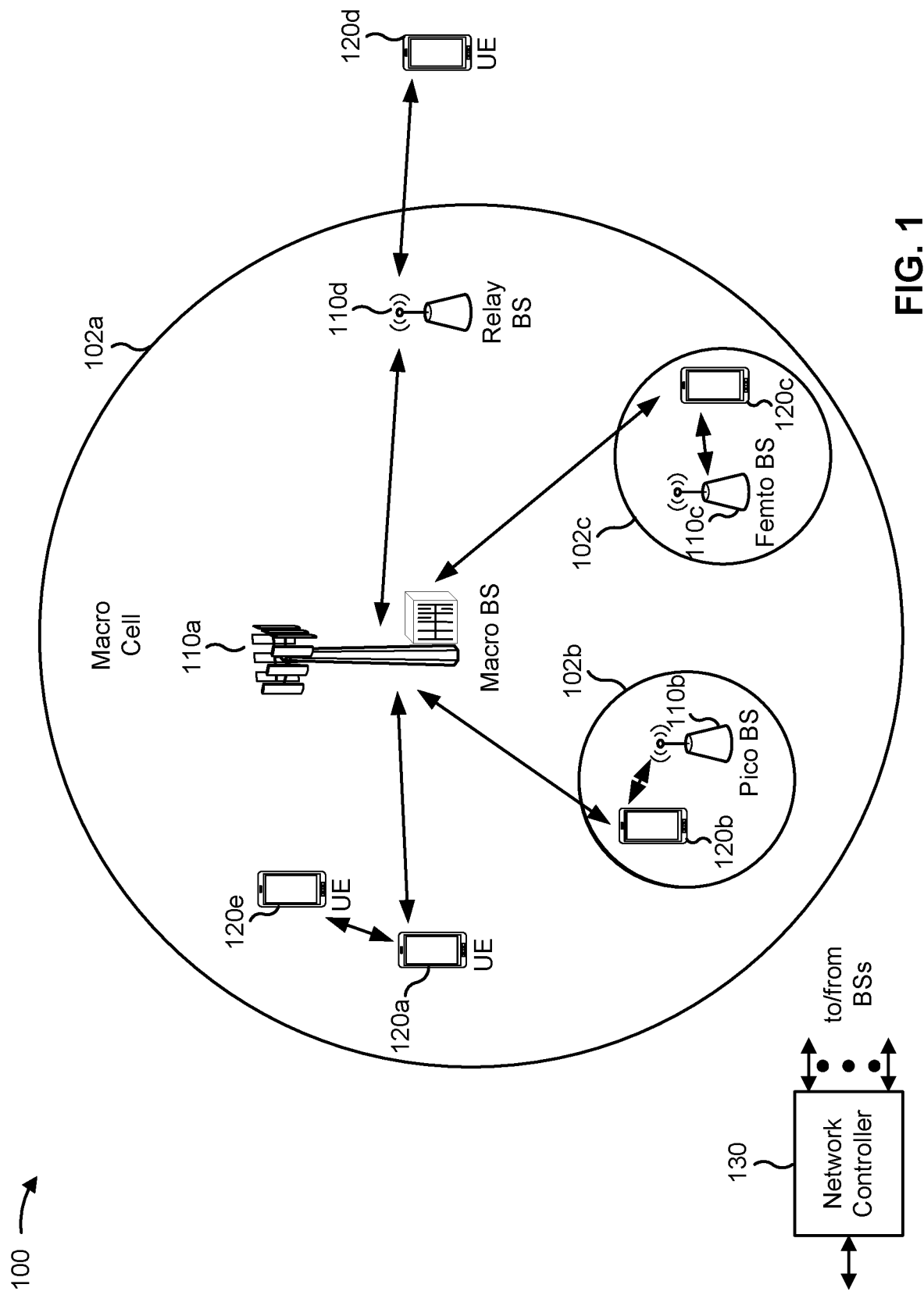
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
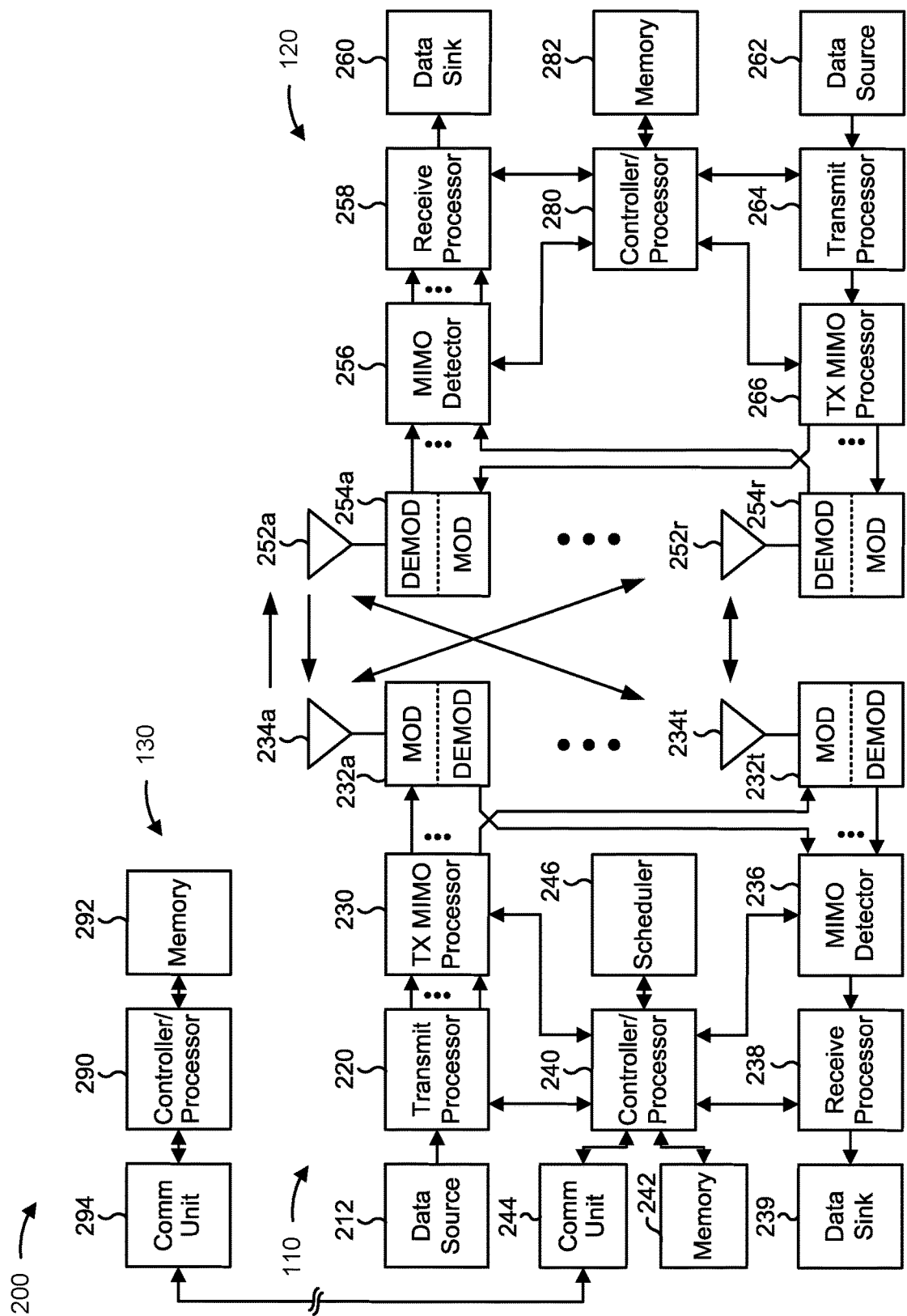
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a CQI parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with exposure-based suspensions of communication attempts, as described in more detail elsewhere herein. For example, controller/processor 240 of base station 110, controller/processor 280 of UE 120, and/or any other component(s) of FIG. 2 may perform or direct operations of, for example, process 400 of FIG. 4, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, and/or other processes as described herein. In some aspects, executing instructions may include running the instructions, converting the instructions, compiling the instructions, and/or interpreting the instructions.

In some aspects, the UE includes means for communicating via a first connection using one or more transmit parameters; means for determining to suspend subsequent attempts to communicate via a second connection, in a dual connection mode, based at least in part on satisfaction of a threshold number of failed attempts to communicate via the second connection; and/or means for determining one or more parameters for suspension of the subsequent attempts to communicate via the second connection based at least in part on a determination that satisfaction of the threshold number of failed attempts is associated with one or more exposure conditions that are based at least in part on the one or more transmit parameters. The means for the UE to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the UE includes means for determining one or more conditions that allow an increase in transmission power for one or more of the subsequent attempts to communicate via the second connection; and/or means for modifying the one or more parameters for the suspension of the subsequent attempts to communicate via the second connection.

As indicated above, FIG. 2 is provided as an example. Other examples may differ from what is described with regard to FIG. 2.

In some networks, a UE may be configured to suspend subsequent attempts to communicate via a connection after a number of failed attempts to communicate. The failed attempts to communicate may be based on network conditions and/or conditions at the UE. However, failed attempts to communicate based at least in part on some conditions at the UE may not warrant a suspension having the same parameters as parameters of a suspension for failed attempts to communicate based at least in part on network conditions and/or other conditions at the UE. For example, failed attempts to communicate based at least in part on one or more exposure conditions (e.g., a maximum permissible exposure parameter and/or a specific absorption rate, among other examples) may be based on one or more settings of the UE that may change differently from network conditions (e.g., channel conditions).

For example, if the UE is communicating via a first connection (e.g., an anchor connection) that is a high priority connection, the UE may allow a relatively high exposure budget for the first connection and may allow a relatively low exposure budget for a second connection that is a low priority connection. Based at least in part on the second connection having a relatively low exposure budget, the UE may not transmit physical random access channel (PRACH) communications and/or scheduling requests, among other examples, with sufficient power to reach a base station that may provide the second connection. However, a change in a transmit power associated with communicating via the first connection, a change in an average transmission power associated with communicating via the first connection, and/or a change of one or more transmit parameters of an additional connection may allow the UE to increase a transmission power for the second connection, which may allow the UE to establish the second connection. However, based at least in part on the UE suspending the subsequent attempts to communicate via the second connection, the UE may be prohibited from using the second connection even after a change in conditions that may allow the UE to establish the second connection.

In some aspects described herein, a UE may determine whether failed attempts to communicate via a second connection are based at least in part on network conditions or local conditions of the UE. For example, the UE may determine that the failed attempts to communicate may be based at least in part on an exposure limit that includes exposure from another transmitter of the UE (e.g., via a first connection).

Based on a determination that the failed attempts are based on an exposure condition (and not a network condition), the UE may apply one or more parameters to a suspension of subsequent attempts to communicate via the second connection. For example, the one or more parameters may include a duration for the suspension of the subsequent attempts to communicate via the second connection, an indication of whether to enforce the suspension of the subsequent attempts to communicate via the second connection, and/or an indication of whether to suspend subsequent attempts to communicate via other connections having one or more parameters in common with the second connection. In this way, the UE may attempt to establish the second connection relatively soon after determining that a threshold number of attempts to communicate have failed, based at least in part on a cause of the failed attempts being based at least in part on an exposure condition. This may allow the UE to communicate with improved spectral efficiency, improve a likelihood of radio link failure from subsequent attempts to communicate via the second connection, and/or conserve network resources.

Figure 3:
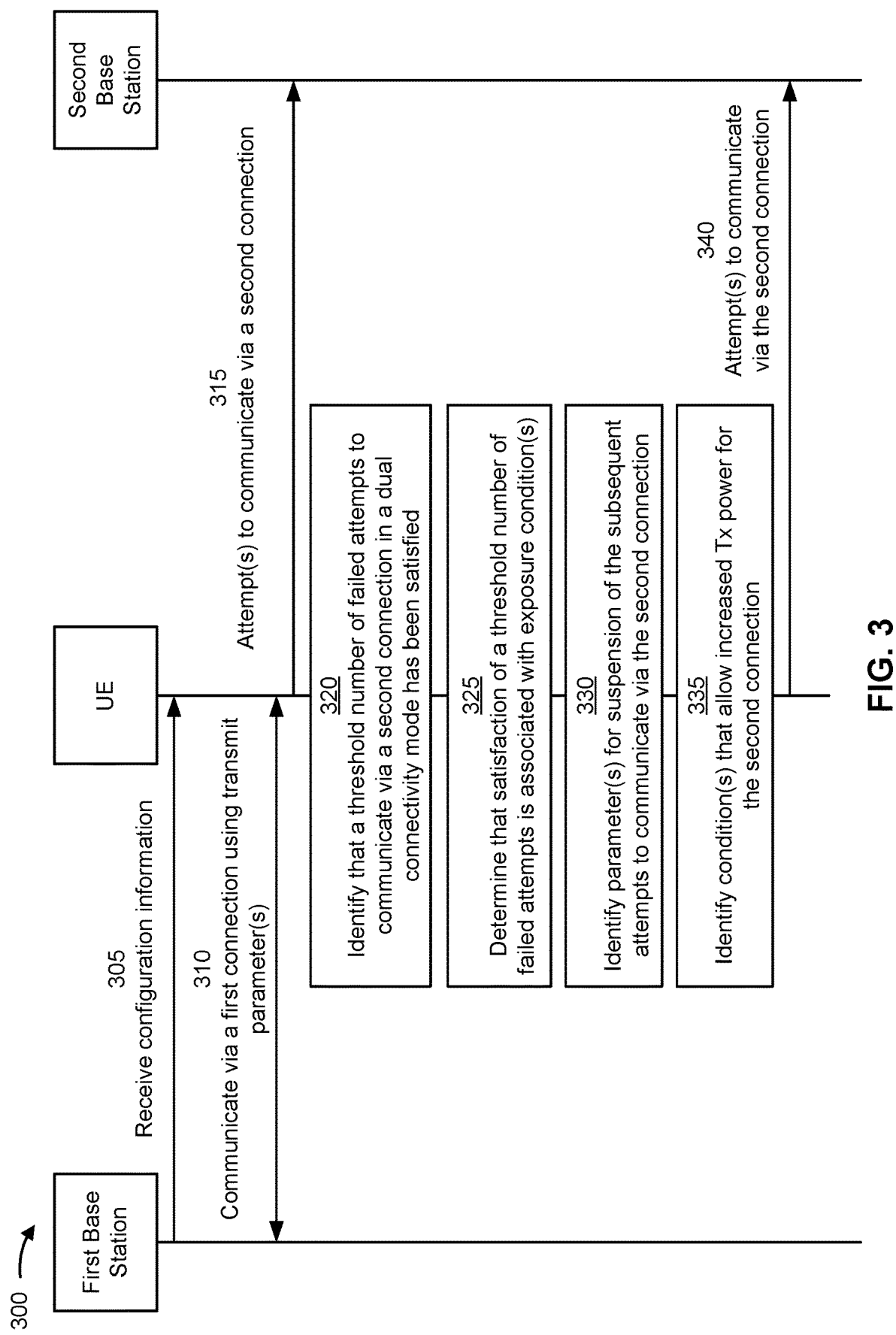
FIG. 3 is a diagram illustrating an example associated with exposure-based suspensions of communication attempts, in accordance with the present disclosure.

FIG. 3 is a diagram illustrating an example 300 associated with exposure-based suspensions of communication attempts, in accordance with the present disclosure. As shown in FIG. 3, a UE (e.g., UE 120) may communicate with a first base station (e.g., base station 110) and/or a second base station (e.g., base station 110). The UE may communicate with the first base station via a first connection and the UE may communicate, or attempt to communicate, with the second base station via a second connection. In some aspects, the UE, the first base station, and/or the second base station may be part of one or more wireless networks (e.g., wireless network 100).

As shown by reference number 305, the UE may receive, and the first base station may transmit, configuration information. In some aspects, the UE may receive configuration information from another device (e.g., from the second base station and/or another UE) and/or a communication standard, among other examples. In some aspects, the UE may receive the configuration information via one or more of radio resource control (RRC) signaling, medium access control (MAC) signaling (e.g., MAC control elements (MAC CEs)), and/or the like. In some aspects, the configuration information may include an indication of one or more configuration parameters (e.g., already known to the UE) for selection by the UE, explicit configuration information for the UE to use to configure the UE, and/or the like.

In some aspects, the configuration information may indicate that the UE is to determine that a number of attempts to communicate via the second connection have failed, to determine to suspend subsequent attempts to communicate via the second connection, and/or to determine one or more parameters for the suspension (e.g., a duration for the suspension, an indication of whether to enforce the suspension, and/or an indication of whether to suspend attempts to communicate via other connections having one or more parameters in common with the second connection, among other examples) of the subsequent attempts to communicate via the second connection based at least in part on a determined cause for the failed attempts to communicate via the second connection. In some aspects, the configuration information may indicate that the UE is to determine whether one or more conditions allow an increase in transmission power for one or more of the subsequent attempts to communicate via the second connection, and to modify the one or more parameters for the suspension of the subsequent attempts to communicate via the second connection based at least in part on the one or more conditions.

The UE may configure the UE based at least in part on the configuration information. In some aspects, the UE may be configured to perform one or more operations described herein.

As shown by reference number 310, the UE may communicate via the first connection using one or more transmit parameters. For example, the one or more transmit parameters may include a transmit power and/or a time average power, among other examples.

As shown by reference number 315, the UE may perform one or more attempts to communicate via the second connection. In some aspects, the one or more attempts to communicate via the second connection may fail based at least in part on network conditions and/or one or more conditions of the UE. For example, the one or more attempts to communicate via the second connection may fail based at least in part on one or more exposure conditions. For example, a smart transmit component of the UE may limit one or more transmit parameters for the failed one or more attempts based at least in part on a determination that an overall amount of radiation and/or exposure would otherwise satisfy (e.g., meet or exceed) a threshold (e.g., a regulatory limit).

In some aspects, the second connection may be associated with one or more cell parameters including a radio access technology, a cell identification, a bandwidth, a bandwidth part, and/or a frequency range of operation, among other examples.

As shown by reference number 320, the UE may identify that a threshold number of failed attempts to communicate via a second connection in a dual connectivity mode has been satisfied. In some aspects, the UE may determine to suspend subsequent attempts to communicate via the second connection based at least in part on identification the threshold number of failed attempts (e.g., a number of failed attempts satisfies the threshold). In some aspects, the UE may determine to suspend subsequent attempts to communicate via a second connection, in a dual connection mode (e.g., with the first connection), based at least in part on satisfaction of a threshold number of failed attempts to communicate via the second connection. In some aspects, the suspension of the subsequent attempts may include a blacklisting process to blacklist a cell associated with the second connection (e.g., for a period of time).

As shown by reference number 325, the UE may determine that satisfaction of a threshold number of failed attempts is associated with one or more exposure conditions. For example, the UE may determine that satisfaction of the threshold number of failed attempts is associated with one or more exposure conditions that are based at least in part on the one or more transmit parameters used to transmit via the first connection. In some aspects, the UE may determine that the threshold number of failed attempts to communicate via the second connection is based at least in part on application of a power limiting operation for one or more transmit parameters associated with the threshold number of failed attempts. In other words, the UE may determine that a cause of the failed attempts is based at least in part on applying the power limited operation to the second connection based at least in part on using a relatively large portion of an exposure budget for the first connection.

As shown by reference number 330, the UE may identify one or more parameters for suspension of the subsequent attempts to communicate via the second connection. In some aspects, the UE may identify the one or more parameters for suspension of the subsequent attempts to communicate via the second connection based at least in part on a determination that the threshold number of failed attempts is associated with one or more exposure conditions that are based at least in part on the one or more transmit parameters.

In some aspects, the suspension of the subsequent attempts to communicate via the second connection may include a suspension of attempts to communicate with connections having one or more parameters in common with the second connection.

In some aspects, the one or more parameters for suspension of the subsequent attempts to communicate via the second connection may include a duration for the suspension of the subsequent attempts to communicate via the second connection, an indication of whether to enforce the suspension of the subsequent attempts to communicate via the second connection, and/or an indication of whether to suspend subsequent attempts to communicate via other connections having one or more parameters in common with the second connection, among other examples.

In some aspects, the determination of the one or more parameters for suspension of the subsequent attempts to communicate via the second connection is based at least in part on one or more parameters of a candidate connection, having one or more parameters in common with the second connection, via a neighbor cell, a radio access technology of the second connection, a bandwidth of the second connection, a bandwidth part of the second connection, and/or a frequency range of operation for the second connection, among other examples.

As shown by reference number 335, the UE may identify one or more conditions that allow increased transmission (Tx) power for the second connection. For example, the UE may identify and/or determine one or more conditions that allow an increase in transmission power for one or more of the subsequent attempts to communicate via the second connection. In some aspects, the UE may identify the one or more conditions as including a change (e.g., reduction) in a transmit power associated with communicating via the first connection, a change (e.g., reduction) in an average transmission power associated with communicating via the first connection, and/or a change of one or more transmit parameters of an additional connection (e.g., via a connection that is not the first connection or the second connection), among other examples.

In some aspects, the UE may modify the one or more parameters for the suspension of the subsequent attempts to communicate via the second connection based at least in part on determining the one or more conditions that allow the increase in transmission power. In some aspects, the modification of the one or more parameters for the suspension of the subsequent attempts to communicate via the second connection may include termination of the suspension of the subsequent attempts to communicate via the second connection and resumption of the subsequent attempts to communicate via the second connection.

As shown by reference number 340, the UE may perform one or more attempts to communicate via the second connection. In some aspects, the UE may perform the one or more attempts to communicate via the second connection based at least in part on determining the one or more conditions that allow increased transmission power for the second connection. In some aspects, the UE may perform the one or more attempts to communicate via the second connection based at least in part on completion of the suspension (e.g., expiration of the duration for the suspension).

Based on the UE applying one or more parameters to a suspension of subsequent attempts to communicate via the second connection, the UE may attempt to establish the second connection relatively soon after determining that a threshold number of attempts to communicate have failed, based at least in part on a cause of the failed attempts being based at least in part on an exposure condition. This may allow the UE to communicate with improved spectral efficiency, improve a likelihood of radio link failure from subsequent attempts to communicate via the second connection, and/or conserve network resources.

As indicated above, FIG. 3 is provided as an example. Other examples may differ from what is described with regard to FIG. 3.

Figure 4:
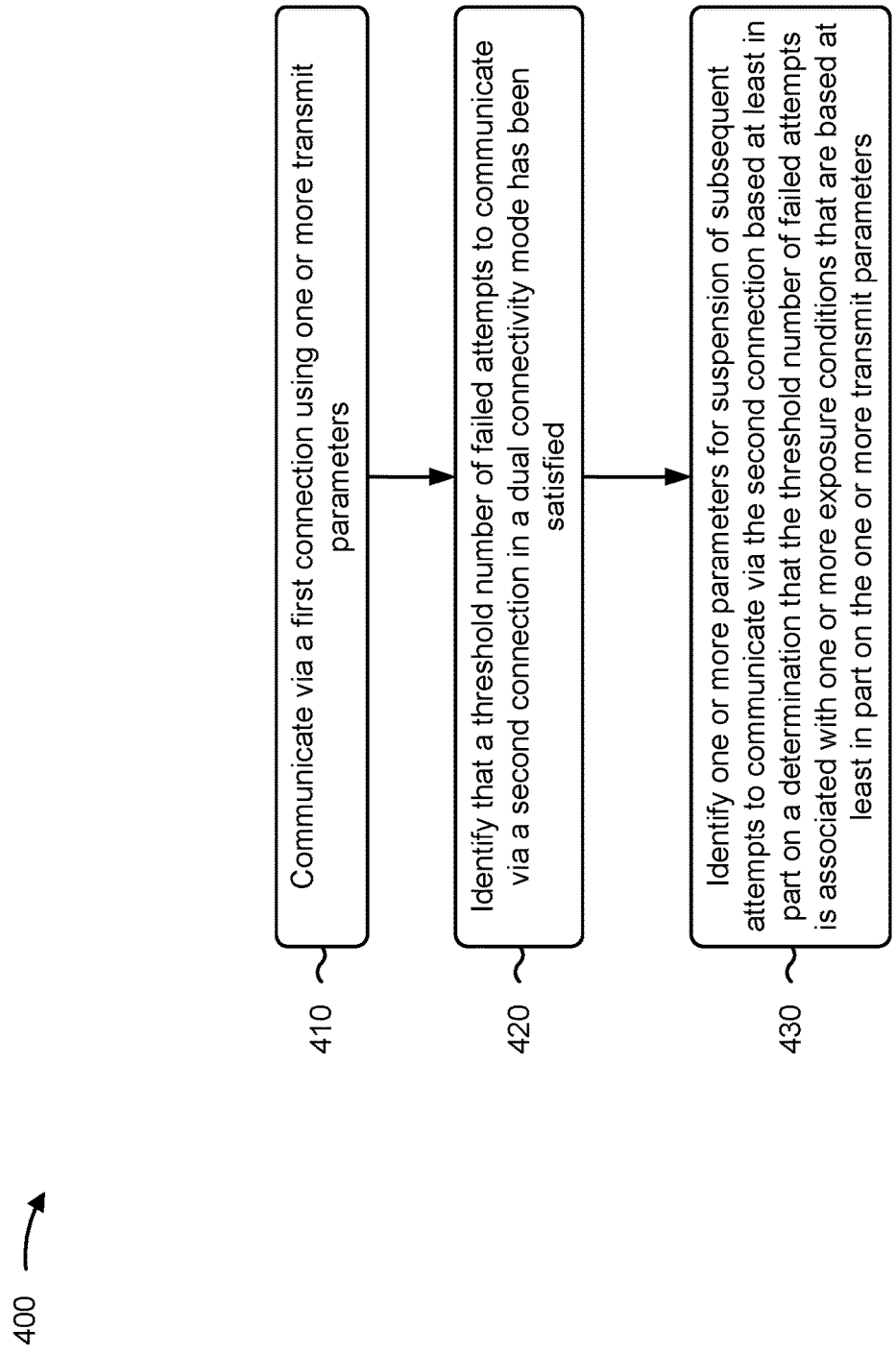
FIG. 4 is a diagram illustrating an example process associated with exposure-based suspensions of communication attempts, in accordance with the present disclosure.

FIG. 4 is a diagram illustrating an example process 400 performed, for example, by a UE, in accordance with the present disclosure. Example process 400 is an example where the UE (e.g., UE 120) performs operations associated with techniques for exposure-based suspensions of communication attempts.

As shown in FIG. 4, in some aspects, process 400 may include communicating via a first connection using one or more transmit parameters (block 410). For example, the UE (e.g., using reception component 502 and/or transmission component 504, depicted in FIG. 5) may communicate via a first connection using one or more transmit parameters, as described above.

As further shown in FIG. 4, in some aspects, process 400 may include identifying that a threshold number of failed attempts to communicate via a second connection in a dual connectivity mode has been satisfied (block 420). For example, the UE (e.g., using communication manager 508, depicted in FIG. 5) may identify that a threshold number of failed attempts to communicate via a second connection in a dual connectivity mode has been satisfied, as described above.

As further shown in FIG. 4, in some aspects, process 400 may include identifying one or more parameters for suspension of subsequent attempts to communicate via the second connection based at least in part on a determination that the threshold number of failed attempts is associated with one or more exposure conditions that are based at least in part on the one or more transmit parameters (block 430). For example, the UE (e.g., using communication manager 508, depicted in FIG. 5) may identify one or more parameters for suspension of subsequent attempts to communicate via the second connection based at least in part on a determination that the threshold number of failed attempts is associated with one or more exposure conditions that are based at least in part on the one or more transmit parameters, as described above.

Process 400 may include additional aspects, such as any single aspect or any combination of aspects described below and/or in connection with one or more other processes described elsewhere herein.

In a first aspect, the suspension of the subsequent attempts comprises a blacklisting process to blacklist a cell associated with the second connection.

In a second aspect, alone or in combination with the first aspect, the second connection is associated with one or more cell parameters including one or more of a radio access technology, a cell identification, a bandwidth, a bandwidth part, or a frequency range of operation.

In a third aspect, alone or in combination with one or more of the first and second aspects, the suspension of the subsequent attempts to communicate via the second connection includes a suspension of attempts to communicate with connections having one or more parameters in common with the second connection.

In a fourth aspect, alone or in combination with one or more of the first through third aspects, the determination that the threshold number of failed attempts is associated with the one or more exposure conditions that are based at least in part on the one or more transmit parameters comprises a determination that the threshold number of failed attempts to communicate via the second connection is based at least in part on application of a power limiting operation that is applied to one or more transmit parameters associated with the threshold number of failed attempts.

In a fifth aspect, alone or in combination with one or more of the first through fourth aspects, the application of the power limiting operation is based at least in part on using the one or more transmit parameters for communicating via the first connection.

In a sixth aspect, alone or in combination with one or more of the first through fifth aspects, the one or more parameters for suspension of the subsequent attempts to communicate via the second connection comprise one or more of a duration for the suspension of the subsequent attempts to communicate via the second connection, an indication of whether to enforce the suspension of the subsequent attempts to communicate via the second connection, or an indication of whether to suspend subsequent attempts to communicate via other connections having one or more parameters in common with the second connection.

In a seventh aspect, alone or in combination with one or more of the first through sixth aspects, process 400 includes identifying one or more conditions that allow an increase in transmission power for one or more of the subsequent attempts to communicate via the second connection, and modifying the one or more parameters for the suspension of the subsequent attempts to communicate via the second connection.

In an eighth aspect, alone or in combination with one or more of the first through seventh aspects, the modification of the one or more parameters for the suspension of the subsequent attempts to communicate via the second connection comprises termination of the suspension of the subsequent attempts to communicate via the second connection, and of the subsequent attempts to communicate via the second connection.

In a ninth aspect, alone or in combination with one or more of the first through eighth aspects, the one or more conditions comprise a change in a transmit power associated with communicating via the first connection, a change in an average transmission power associated with communicating via the first connection, or a change of one or more transmit parameters of an additional connection.

In a tenth aspect, alone or in combination with one or more of the first through ninth aspects, the determination of the one or more parameters for suspension of the subsequent attempts to communicate via the second connection is based at least in part on one or more of: one or more parameters of a candidate connection, having one or more parameters in common with the second connection, via a neighbor cell; a radio access technology of the second connection; a bandwidth of the second connection; a bandwidth part of the second connection; or a frequency range of operation for the second connection.

In an eleventh aspect, alone or in combination with one or more of the first through tenth aspects, process 400 includes attempting to communicate via the second connection before the identification that the threshold number of failed attempts to communication via the second connection in the dual connectivity mode has been satisfied.

In a twelfth aspect, alone or in combination with one or more of the first through tenth aspects, process 400 includes attempting to communicate via the second connection after the suspension of the subsequent attempts to communicate via the second connection.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
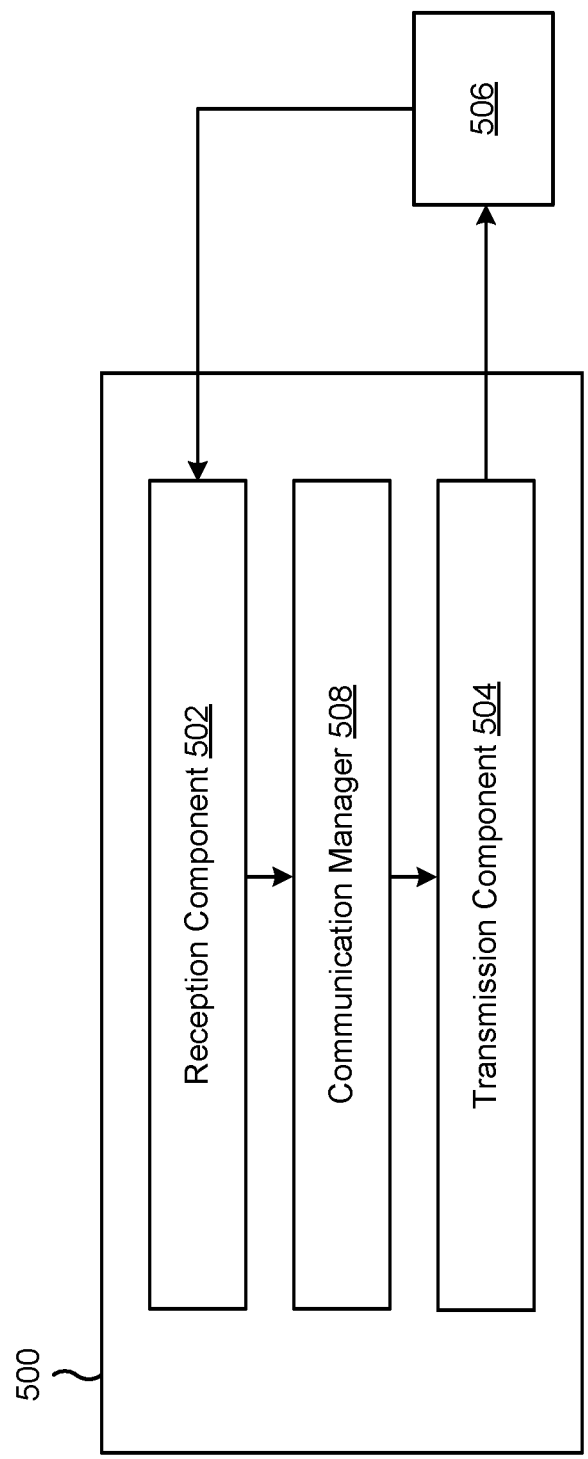
FIG. 5 is a block diagram of an example apparatus for wireless communication, in accordance with the present disclosure.

FIG. 5 is a block diagram of an example apparatus 500 for wireless communication. The apparatus 500 may be a UE, or a UE may include the apparatus 500. In some aspects, the apparatus 500 includes a reception component 502 and a transmission component 504, which may be in communication with one another (for example, via one or more buses and/or one or more other components). As shown, the apparatus 500 may communicate with another apparatus 506 (such as a UE, a base station, or another wireless communication device) using the reception component 502 and the transmission component 504. As further shown, the apparatus 500 may include a communication manager 508.

In some aspects, the apparatus 500 may be configured to perform one or more operations described herein in connection with FIG. 3. Additionally or alternatively, the apparatus 500 may be configured to perform one or more processes described herein, such as process 400 of FIG. 4. In some aspects, the apparatus 500 and/or one or more components shown in FIG. 5 may include one or more components of the UE described above in connection with FIG. 2. Additionally, or alternatively, one or more components shown in FIG. 5 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 502 may receive communications, such as reference signals, control information, data communications, or a combination thereof, from the apparatus 506. The reception component 502 may provide received communications to one or more other components of the apparatus 500. In some aspects, the reception component 502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 506. In some aspects, the reception component 502 may include one or more antennas, a demodulator, a MIMO detector, a receive processor, a controller/processor, a memory, or a combination thereof, of the UE described above in connection with FIG. 2.

The transmission component 504 may transmit communications, such as reference signals, control information, data communications, or a combination thereof, to the apparatus 506. In some aspects, one or more other components of the apparatus 506 may generate communications and may provide the generated communications to the transmission component 504 for transmission to the apparatus 506. In some aspects, the transmission component 504 may perform signal processing on the generated communications (such as filtering, amplification, modulation, digital-to-analog conversion, multiplexing, interleaving, mapping, or encoding, among other examples), and may transmit the processed signals to the apparatus 506. In some aspects, the transmission component 504 may include one or more antennas, a modulator, a transmit MIMO processor, a transmit processor, a controller/processor, a memory, or a combination thereof, of the UE described above in connection with FIG. 2. In some aspects, the transmission component 504 may be co-located with the reception component 502 in a transceiver.

The reception component 502 and/or transmission component 504 may communicate via a first connection using one or more transmit parameters. The communication manager 508 may determine to suspend subsequent attempts to communicate via a second connection, in a dual connection mode, based at least in part on satisfaction of a threshold number of failed attempts to communicate via the second connection. In some aspects, the communication manager 508 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The communication manager 508 may determine one or more parameters for suspension of the subsequent attempts to communicate via the second connection based at least in part on a determination that satisfaction of the threshold number of failed attempts is associated with one or more exposure conditions that are based at least in part on the one or more transmit parameters.

In some aspects, the communication manager 508 may identify that a threshold number of failed attempts to communicate via a second connection in a dual connectivity mode has been satisfied. In some aspects, the communication manager 508 may identify one or more parameters for suspension of subsequent attempts to communicate via the second connection based at least in part on a determination that the threshold number of failed attempts is associated with one or more exposure conditions that are based at least in part on the one or more transmit parameters.

The communication manager 508 may determine and/or identify one or more conditions that allow an increase in transmission power for one or more of the subsequent attempts to communicate via the second connection.

The communication manager 508 may modify the one or more parameters for the suspension of the subsequent attempts to communicate via the second connection.

The number and arrangement of components shown in FIG. 5 are provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally or alternatively, a set of (one or more) components shown in FIG. 5 may perform one or more functions described as being performed by another set of components shown in FIG. 5.

The following provides an overview of some Aspects of the present disclosure:

Aspect 1: A method of wireless communication performed by a user equipment (UE), comprising: communicating via a first connection using one or more transmit parameters; identifying that a threshold number of failed attempts to communicate via a second connection in a dual connectivity mode has been satisfied; and identifying one or more parameters for suspension of subsequent attempts to communicate via the second connection based at least in part on a determination that the threshold number of failed attempts is associated with one or more exposure conditions that are based at least in part on the one or more transmit parameters.

Aspect 2: The method of Aspect 1, wherein the suspension of the subsequent attempts comprises a blacklisting process to blacklist a cell associated with the second connection.

Aspect 3: The method of any of Aspects 1-2, wherein the suspension of the subsequent attempts to communicate via the second connection includes a suspension of attempts to communicate via connections having one or more parameters in common with the second connection, and wherein the one or more parameters include one or more of: a radio access technology, a cell identification, a bandwidth, a bandwidth part, or a frequency range of operation.

Aspect 4: The method of any of Aspects 1-3, wherein the determination that the threshold number of failed attempts is associated with the one or more exposure conditions that are based at least in part on the one or more transmit parameters comprises: a determination that the threshold number of failed attempts to communicate via the second connection is based at least in part on application of a power limiting operation that is applied to one or more transmit parameters associated with the threshold number of failed attempts.

Aspect 5: The method of Aspect 4, wherein the application of the power limiting operation is based at least in part on using the one or more transmit parameters for communicating via the first connection.

Aspect 6: The method of any of Aspects 1-5, wherein the one or more parameters for suspension of the subsequent attempts to communicate via the second connection comprise one or more of: a duration for the suspension of the subsequent attempts to communicate via the second connection, an indication of whether to enforce the suspension of the subsequent attempts to communicate via the second connection, or an indication of whether to suspend subsequent attempts to communicate via other connections having one or more parameters in common with the second connection.

Aspect 7: The method of any of Aspects 1-6, further comprising: identifying one or more conditions that allow an increase in transmission power for one or more of the subsequent attempts to communicate via the second connection; and modifying the one or more parameters for the suspension of the subsequent attempts to communicate via the second connection.

Aspect 8: The method of Aspect 8, wherein the modification of the one or more parameters for the suspension of the subsequent attempts to communicate via the second connection comprises: termination of the suspension of the subsequent attempts to communicate via the second connection; and resumption of the subsequent attempts to communicate via the second connection.

Aspect 9: The method of any of Aspects 8-9, wherein the one or more conditions comprise: a change in a transmit power associated with communicating via the first connection, a change in an average transmission power associated with communicating via the first connection, or a change of one or more transmit parameters of an additional connection.

Aspect 10: The method of any of Aspects 1-9, wherein the determination of the one or more parameters for suspension of the subsequent attempts to communicate via the second connection is based at least in part on one or more of: one or more parameters of a candidate connection, having one or more parameters in common with the second connection, via a neighbor cell, a radio access technology of the second connection, a bandwidth of the second connection, a bandwidth part of the second connection, or a frequency range of operation for the second connection.

Aspect 11: The method of any of Aspects 1-10, further comprising: attempting to communicate via the second connection before the identification that the threshold number of failed attempts to communication via the second connection in the dual connectivity mode has been satisfied.

Aspect 12: The method of any of Aspects 1-11, further comprising: attempting to communicate via the second connection after the suspension of the subsequent attempts to communicate via the second connection.

Aspect 13: An apparatus for wireless communication at a device, comprising a processor; memory coupled with the processor; and instructions stored in the memory and executable by the processor to cause the apparatus to perform the method of one or more of Aspects 1-12

Aspect 14: A device for wireless communication, comprising a memory and one or more processors coupled to the memory, the one or more processors configured to perform the method of one or more of Aspects 1-12.

Aspect 15: An apparatus for wireless communication, comprising at least one means for performing the method of one or more of Aspects 1-12.

Aspect 16: A non-transitory computer-readable medium storing code for wireless communication, the code comprising instructions executable by a processor to perform the method of one or more of Aspects 1-12.

Aspect 17: A non-transitory computer-readable medium storing a set of instructions for wireless communication, the set of instructions comprising one or more instructions that, when executed by one or more processors of a device, cause the device to perform the method of one or more of Aspects 1-12.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   communicating via a first connection using one or more transmit parameters;
   identifying that a threshold number of failed attempts to communicate via a second connection in a dual connectivity mode has been satisfied; and
   identifying one or more parameters for suspension of subsequent attempts to communicate via the second connection based at least in part on a determination that the threshold number of failed attempts is associated with one or more exposure conditions that are based at least in part on the one or more transmit parameters.

2. The method of claim 1, wherein the suspension of the subsequent attempts comprises a blacklisting process to blacklist a cell associated with the second connection.

3. The method of claim 1, wherein the suspension of the subsequent attempts to communicate via the second connection includes a suspension of attempts to communicate via connections having one or more parameters in common with the second connection, and
   wherein the one or more parameters include one or more of:
   a radio access technology,
   a cell identification,
   a bandwidth,
   a bandwidth part, or
   a frequency range of operation.

4. The method of claim 1, wherein the determination that the threshold number of failed attempts is associated with the one or more exposure conditions that are based at least in part on the one or more transmit parameters comprises:
   a determination that the threshold number of failed attempts to communicate via the second connection is based at least in part on application of a power limiting operation that is applied to one or more transmit parameters associated with the threshold number of failed attempts.

5. The method of claim 4, wherein the application of the power limiting operation is based at least in part on using the one or more transmit parameters for communicating via the first connection.

6. The method of claim 1, wherein the one or more parameters for suspension of the subsequent attempts to communicate via the second connection comprise one or more of:
   a duration for the suspension of the subsequent attempts to communicate via the second connection,
   an indication of whether to enforce the suspension of the subsequent attempts to communicate via the second connection, or
   an indication of whether to suspend subsequent attempts to communicate via other connections having one or more parameters in common with the second connection.

7. The method of claim 1, further comprising:
   identifying one or more conditions that allow an increase in transmission power for one or more of the subsequent attempts to communicate via the second connection; and
   modifying the one or more parameters for the suspension of the subsequent attempts to communicate via the second connection.

8. The method of claim 7, wherein the modification of the one or more parameters for the suspension of the subsequent attempts to communicate via the second connection comprises:
   termination of the suspension of the subsequent attempts to communicate via the second connection; and
   resumption of the subsequent attempts to communicate via the second connection.

9. The method of claim 7, wherein the one or more conditions comprise:
   a change in a transmit power associated with communicating via the first connection,
   a change in an average transmission power associated with communicating via the first connection, or
   a change of one or more transmit parameters of an additional connection.

10. The method of claim 1, wherein the determination of the one or more parameters for suspension of the subsequent attempts to communicate via the second connection is based at least in part on one or more of:

one or more parameters of a candidate connection, having one or more parameters in common with the second connection, via a neighbor cell,
a radio access technology of the second connection,
a bandwidth of the second connection,
a bandwidth part of the second connection, or
a frequency range of operation for the second connection.

11. The method of claim 1, further comprising:
attempting to communicate via the second connection before the identification that the threshold number of failed attempts to communication via the second connection in the dual connectivity mode has been satisfied.

12. The method of claim 1, further comprising:
attempting to communicate via the second connection after the suspension of the subsequent attempts to communicate via the second connection.

13. A user equipment (UE) for wireless communication, comprising:
a memory; and
one or more processors, coupled to the memory, configured to:
communicate via a first connection using one or more transmit parameters;
identify that a threshold number of failed attempts to communicate via a second connection in a dual connectivity mode has been satisfied; and
identify one or more parameters for suspension of subsequent attempts to communicate via the second connection based at least in part on a determination that the threshold number of failed attempts is associated with one or more exposure conditions that are based at least in part on the one or more transmit parameters.

14. The UE of claim 13, wherein the suspension of the subsequent attempts comprises a blacklisting process to blacklist a cell associated with the second connection.

15. The UE of claim 13, wherein the suspension of the subsequent attempts to communicate via the second connection includes a suspension of attempts to communicate via connections having one or more parameters in common with the second connection, and
wherein the one or more parameters include one or more of:
a radio access technology,
a cell identification,
a bandwidth,
a bandwidth part, or
a frequency range of operation.

16. The UE of claim 13, wherein the determination that the threshold number of failed attempts is associated with the one or more exposure conditions that are based at least in part on the one or more transmit parameters comprises:
a determination that the threshold number of failed attempts to communicate via the second connection is based at least in part on application of a power limiting operation that is applied to one or more transmit parameters associated with the threshold number of failed attempts.

17. The UE of claim 16, wherein the application of the power limiting operation is based at least in part on using the one or more transmit parameters for communicating via the first connection.

18. The UE of claim 13, wherein the one or more parameters for suspension of the subsequent attempts to communicate via the second connection comprise one or more of:

a duration for the suspension of the subsequent attempts to communicate via the second connection,
an indication of whether to enforce the suspension of the subsequent attempts to communicate via the second connection, or
an indication of whether to suspend subsequent attempts to communicate via other connections having one or more parameters in common with the second connection.

19. The UE of claim 13, wherein the one or more processors are further configured to:
identify one or more conditions that allow an increase in transmission power for one or more of the subsequent attempts to communicate via the second connection; and
modify the one or more parameters for the suspension of the subsequent attempts to communicate via the second connection.

20. The UE of claim 19, wherein the modification of the one or more parameters for the suspension of the subsequent attempts to communicate via the second connection comprises:
termination of the suspension of the subsequent attempts to communicate via the second connection; and
resumption of the subsequent attempts to communicate via the second connection.

21. The UE of claim 19, wherein the one or more conditions comprise:
a change in a transmit power associated with communicating via the first connection,
a change in an average transmission power associated with communicating via the first connection, or
a change of one or more transmit parameters of an additional connection.

22. The UE of claim 13, wherein the determination of the one or more parameters for suspension of the subsequent attempts to communicate via the second connection is based at least in part on one or more of:
one or more parameters of a candidate connection, having one or more parameters in common with the second connection, via a neighbor cell,
a radio access technology of the second connection,
a bandwidth of the second connection,
a bandwidth part of the second connection, or
a frequency range of operation for the second connection.

23. The UE of claim 13, wherein the one or more processors are further configured to:
attempt to communicate via the second connection before the identification that the threshold number of failed attempts to communication via the second connection in the dual connectivity mode has been satisfied.

24. The UE of claim 13, wherein the one or more processors are further configured to:
attempt to communicate via the second connection after the suspension of the subsequent attempts to communicate via the second connection.

25. A non-transitory computer-readable medium storing a set of instructions for wireless communication, the set of instructions comprising:
one or more instructions that, when executed by one or more processors of a user equipment (UE), cause the UE to:
communicate via a first connection using one or more transmit parameters;
identify that a threshold number of failed attempts to communicate via a second connection in a dual connectivity mode has been satisfied; and identify one or more parameters for suspension of subsequent attempts to communicate via the second connection based at least in part on a determination that the threshold number of failed attempts is associated with one or more exposure conditions that are based at least in part on the one or more transmit parameters.

26. The non-transitory computer-readable medium of claim 25, wherein the suspension of the subsequent attempts to communicate via the second connection includes a suspension of attempts to communicate via connections having one or more parameters in common with the second connection, and wherein the one or more parameters include one or more of:
  a radio access technology,
  a cell identification,
  a bandwidth,
  a bandwidth part, or
  a frequency range of operation.

27. The non-transitory computer-readable medium of claim 25, wherein the one or more parameters for suspension of the subsequent attempts to communicate via the second connection comprise one or more of:
  a duration for the suspension of the subsequent attempts to communicate via the second connection,
  an indication of whether to enforce the suspension of the subsequent attempts to communicate via the second connection, or
  an indication of whether to suspend subsequent attempts to communicate via other connections having one or more parameters in common with the second connection.

28. An apparatus for wireless communication, comprising:
  means for communicating via a first connection using one or more transmit parameters;
  means for identifying that a threshold number of failed attempts to communicate via a second connection in a dual connectivity mode has been satisfied; and
  means for identifying one or more parameters for suspension of subsequent attempts to communicate via the second connection based at least in part on a determination that the threshold number of failed attempts is associated with one or more exposure conditions that are based at least in part on the one or more transmit parameters.

29. The apparatus of claim 28, wherein the suspension of the subsequent attempts to communicate via the second connection includes a suspension of attempts to communicate via connections having one or more parameters in common with the second connection, and wherein the one or more parameters include one or more of:
  a radio access technology,
  a cell identification,
  a bandwidth,
  a bandwidth part, or
  a frequency range of operation.

30. The apparatus of claim 28, wherein the one or more parameters for suspension of the subsequent attempts to communicate via the second connection comprise one or more of:
  a duration for the suspension of the subsequent attempts to communicate via the second connection,
  an indication of whether to enforce the suspension of the subsequent attempts to communicate via the second connection, or
  an indication of whether to suspend subsequent attempts to communicate via other connections having one or more parameters in common with the second connection.

* * * * *